United States Patent [19]

Nishikido

[11] Patent Number: 4,725,976
[45] Date of Patent: Feb. 16, 1988

[54] PROGRAMMABLE CONTROLLER

[75] Inventor: Kenji Nishikido, Ibaragi, Japan

[73] Assignee: Omron Tateisi Electronics Co., Kyoto, Japan

[21] Appl. No.: 898,898

[22] Filed: Aug. 21, 1986

Related U.S. Application Data

[63] Continuation of Ser. No. 410,842, Aug. 23, 1982, abandoned.

[30] Foreign Application Priority Data

Aug. 24, 1981 [JP] Japan .............................. 56-132495
Sep. 1, 1981 [JP] Japan .............................. 56-137446

[51] Int. Cl.⁴ .............................................. G06F 15/46
[52] U.S. Cl. .................................................... 364/900
[58] Field of Search ............... 364/900 MS File, 136, 364/191, 192

[56] References Cited

U.S. PATENT DOCUMENTS

| | | | |
|---|---|---|---|
| 3,996,565 | 12/1976 | Nakao et al. | 364/900 |
| 4,063,311 | 12/1977 | Jeremiah et al. | 364/900 |
| 4,095,094 | 6/1978 | Struger et al. | 364/900 X |
| 4,118,789 | 10/1978 | Casto et al. | 364/900 |
| 4,200,226 | 4/1980 | Piras | 364/187 |
| 4,213,175 | 7/1980 | Kurihara | 364/184 |
| 4,251,883 | 2/1981 | Grants et al. | 364/900 X |
| 4,276,593 | 6/1981 | Hansen | 364/187 |

Primary Examiner—Thomas M. Heckler
Attorney, Agent, or Firm—Cushman, Darby & Cushman

[57] ABSTRACT

In a programmable controller, logical operation between I/O data are performed in accordance with each instruction of a user program optionally set by the user, and simultaneously output data is updated in accordance with the result of its logical operation. The state of inhibiting the control output, at detection of an abnormality in the device at a particular control status, can be optionally set by the user as part of the user program. An abnormal signal of each controller is transmitted to each controller when a controller system of parallel link mode is constituted by plural sets, further whether intra machine control output action is inhibited or not by an abnormal signal from another machine can be optionally set by the user as part of the user program.

6 Claims, 9 Drawing Figures

PROGRAMMABLE CONTROLLER

This is a continuation of application Ser. No. 410,842, filed Aug. 23, 1982, which was abandoned upon the filing hereof.

BACKGROUND OF THE INVENTION

This invention relates to a programmable controller, capable of self detecting abnormalities.

Programmable controllers are conventionally provided with abnormality diagnostic means for identifying abnormal battery voltages, abnormal temperature rises, and abnormalities in data, etc., by performing parity checks for bus lines. Conventional programmable controllers are constituted in such a manner that the action of the programmable controller is stopped (its output signal is turned off) when an abnormality in the device is detected by the abnormality diagnostic means.

However, the programmable controller, constituted as described above, in which operation of the device is fully stopped at the occurrence of any abnormality in the device, regardless of the kind of abnormality or the status of objective control at the occurrence of the abnormality, is not always practical from the standpoint of its user.

The above mentioned problem normally occurs in a set of programmable controllers. Similarly a further complicated problem occurs in a programmable controller system of the parallel link mode which has already been developed by the inventors of this invention. Referring to the above, a, description will be first given for the programmable controller system of the parallel link mode.

Though a large scale programmable controller must be conventionally used for large scale objective control, the programmable controller system of the parallel link mode has also been considered capable for application to large scale objective control by using plural sets of comparatively small scale programmable controllers. In short, each of the programmable controllers is provided with an input/output memory having larger capacity than a number of intra input/output terminals. For instance, when it is assumed that 64 I/O terminals are provided in a set of programmable controllers a further maximum four sets of controllers can be combined as a system of the parallel link mode. The I/O memory of each controller is provided with capacity of at least 64×4 bits as an I/O data area. When using only a set of programmable controllers, where they operate as a normal controller with 64 I/O items, I/O data exchange means and user program synchronously executing means are provided in each of the programmable controllers so that data of each I/O memory may be exchanged with each other synchronously with execution action of each user program when plural sets of controllers are combined by a link bus. In this way, control action is performed so that an I/O state is transmitted to a local machine, an I/O state of the local machine is received to an intra machine, and on the basis of the I/O states in those total units a user program is executed respectively in each machine to again transmit its execution result to each machine with each other. Accordingly, in a system linked with four sets of programmable controllers, as described above, a control function equal to that obtained in a series of large scale objective control is controlled by a set of programmable controllers with 64×4 I/O, and can be realized by partially executing a control program for the control function with four sets of controllers.

In case the above described system of parallel link mode, since plural sets of linked programmable controllers are allowed to function as a set of programmable controllers in the case of a normally uncontrollable state, at an occurrence of abnormality even in a set of plural linked controllers it is a very hazardous state in that with an objective control equipment it can sometimes result in a quite random controlled condition, unless control action of the system total unit is correspondingly performed for the abnormality.

Further the conventional programmable controller is provided with such abnormality diagnostic means that abnormal voltage in a battery is detected, that an abnormal temperature rise is detected in a device, that a parity check for a bus line in the device is performed to detect abnormality of data, etc., and is constituted in such a manner that the action of the programmable controller is stopped (an output signal is all turned off) when the abnormality of the device is detected by said abnormality diagnostic means.

However, the programmable controller, in which the action of a device is fully stopped regardless of the kind of abnormality or the status of objective control at the occurrence of the abnormality when any abnormal state is caused in the device, has been frequently in a state not always adequate for a practical case from the standpoint of its user.

The above described matter, for a system of parallel link mode, results in a further complicated problem, when abnormality is detected in each programmable controller, that is it is not adequate for its action to be fixedly stopped in a hardware manner.

BRIEF SUMMARY OF THE INVENTION

This invention has been provided by considering the above described problems in the prior art, and its object is to present a programmable controller in which the condition of inhibiting the control output is optionally set by from the standpoint of a user in accordance with which abnormality is detected in the device, and further in what status the control object is placed and what condition is partially taken into a user program.

Another object of this invention is to provide a programmable controller so that for the programmable controller system of the above described parallel link mode, when control output is inhibited by abnormality even in a set of linked programmable controllers, its abnormality signal is promptly transmitted to another programmable controller, and whether intra control output action in each programmable controller is inhibited or not, by the above described abnormality signal from the local machine, can also be programmed partially in the user program.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
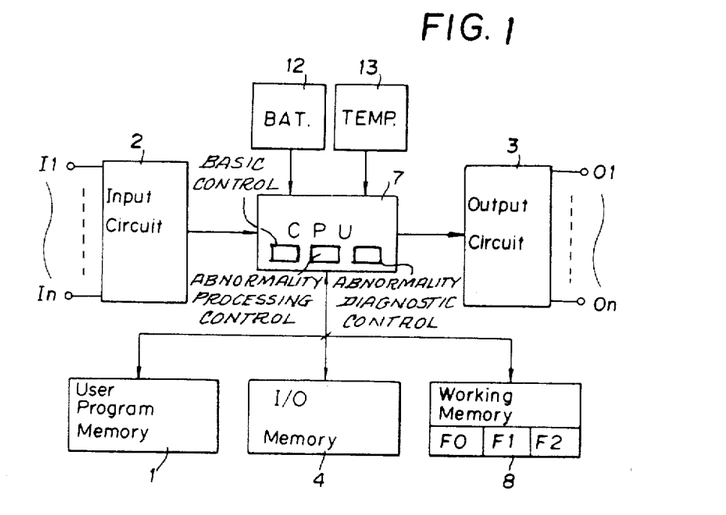
FIG. 1 is a block diagram showing a block diagram of a programmable controller relating to the first embodiment of this invention.

Firstly on the basis of FIGS. 1~3, description will be made for the first embodiment of this invention. This programmable controller basically comprises a user program memory 1, containing a user program, input circuit 2, applied with an external input signal, output circuit 3, sending an external output signal, I/O memory 4, buffer memory of I/O data corresponding to the above described input circuit 2 and output circuit 3, instruction executing means, executing each instruction of the above described user program memory 1 successively at high speed and processing arithmetic operation on the basis of data of the above described I/O memory 4 then rewriting output data of the above described I/O memory 4 by its processing result, input updating means, writing input data of the above described input circuit 2 in a prescribed area of the above described I/O memory 4, and output updating means, setting output data in a prescribed area of the above described I/O memory 4 to the above described output circuit 3. The above described instruction executing means, input updating means and output updating means are realized by a CPU (Central Processing Unit) 7 constituted by a so-called microprocessor. The CPU7, in addition to the control action as the instruction executing means and I/O updating means, executes a various OS process (Operating system) as described later. A RAM memory 8 is used as a working memory.

Further a programmable controller relating to this invention is provided with plural kinds of abnormality diagnostic means, detecting abnormality in the inside of a device, a plurality of abnormality flags F1, F2, correspondingly set to each abnormality diagnostic means and set or reset in accordance with its diagnostic result, output inhibition flag FO, set or reset from optional logical operation result between the above described abnormality flags F1, F2 and optional I/O data by executing an instruction optionally set to the above described user program memory 1, partially of the user program during operation of the above described instruction executing means, and output inhibiting means, inhibiting action of the above described output updating means in accordance with a state of this output inhibition flag FO and obtaining a prescribed output state.

The above described abnormality diagnostic means, in this embodiment is provided with a battery abnormality detecting circuit 12, detecting abnormal voltage of a battery, and temperature abnormality of detecting circuit 13, detecting an abnormal temperature rise in the device. Further the above described abnormality flags F1, F2 and output inhibition flag FO are set to the working memory 8. The abnormality of flag F1 is set when abnormality is detected by the battery abnormality detecting circuit 12. The abnormality detecting flag F2 is set when abnormality is detected by the temperature abnormality detecting circuit 13.

Figure 2:
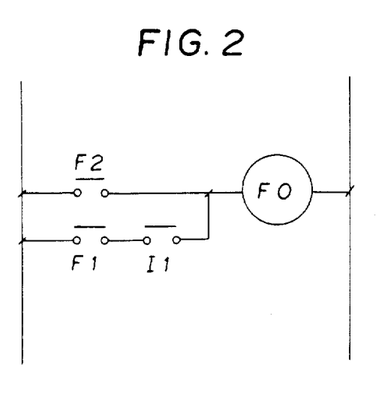
FIG. 2 is a view showing an example of a condition setting program for output inhibition.
Figure 3:
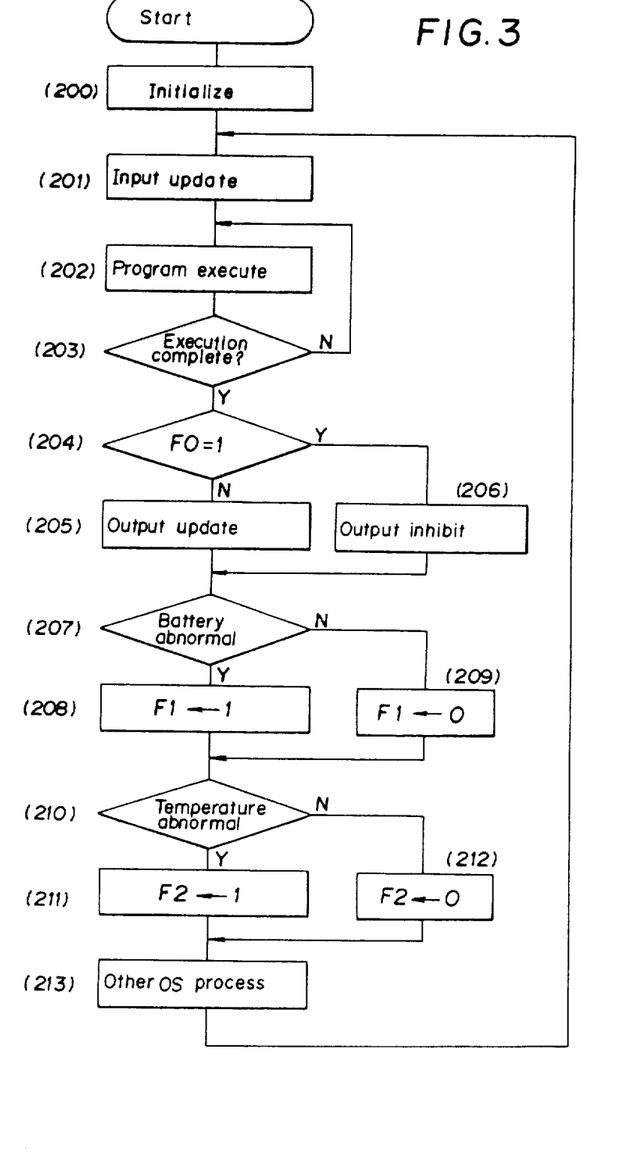
FIG. 3 is a flow chart showing a control action of the above described programmable controller.

The output inhibition flag FO optionally set to the user program so as to be set or reset on condition of the state of the abnormality flags F1, F2 and optional I/O data means that, in case of, for instance, a programmable controller of rudder diagram mode, the output inhibition flag FO is used as an output relay, as shown in FIG. 2, on condition that this relay FO is driven, the abnormality flags F1, F2 are handled as an input contact, simultaneously these input contacts F1, F2 and optional I/O contact relating to an objective control equipment are used to constitute an optional rudder diagram, and the diagram is converted into a prescribed instruction format and previously set to the user program memory 4.

Outlines of the control action by the CPU7 will be described successively in accordance with the flow chart of FIG. 3. The first step 201 following an initializing process 200 writes an external input signal applied to the input circuit 2 in a prescribed area of the I/O memory 4 (action of the input updating means). The next steps 202, 203 execute a user program, stored in the user program memory 1, at high speed from a head address to an end instruction (action of the instruction executing means). In this way, output data of the I/O memory 4 is rewritten in accordance with the execution result of each instruction, simultaneously the state of the above described output inhibition flag is also determined. The next step 204 makes a decision whether the output inhibition flag FO is set or reset. Reset of the output inhibition flag FO means that normal operation not inhibiting control output is performed, in this case control proceeds to the step 205 and output data of the I/O memory 4 are fed to the output circuit 3 and output as an external output signal (action of the output updating means). The next step 207 performs a check for output of the battery abnormality detecting circuit 12 to decide if an abnormality is present. In the case of abnormality, the step 208 sets the abnormality flag F1, while if there is no abnormality, the abnormality flag F1 is reset in the step 209. Output of the temperature abnormality detecting circuit 13 is checked by the successive step 210 to decide if abnormal or not. In the case of an abnormal state, the abnormality flag F2 is set by the step 211, while in the case of no abnormal state, the abnormality flag F2 is reset by step 212. Various OS processes of input accepting process or the like from a monitor display or program console are performed by the following step 213 and then returned to the step 201. The above mentioned steps from 201 to 213 are to be repeatedly executed at high speed. During the process of its execution, in accordance with a progress of the control state of objective equipment, I/O data changes, and if a detected abnormality in the abnormality detecting circuits 12, 13, occurs the abnormality flags F1, F2 are set. Then, assuming that a driving condition of the output inhibition flag FO is set by the user side as shown, for instance, by FIG. 2, in addition to that, the output inhibition flag FO is set in the case of the temperature abnormality flag F2 being set, the battery abnormality flag F1 is set, and further the output inhibition flag FO at the time of an external input signal turned on is set. If the output inhibition flag FO is set, YES is decided in the above described step 204 to proceed to step 206 without performing output updating action in the step 205, and an external output signal led out from the output circuit 3 is turned off in this step 206. Then the process proceeds to the step 207. In this way, the setting can be performed from the standpoint of the user side in such a manner that the output is not inhibited unconditionally when a detected abnormality by the abnormality detecting circuits 12 or 13 occurs, but control can be inhibited when caused by an optionally combined logical state between an output signal of the abnormality detecting circuits 12, 13 and other optional I/O data.

Furthermore, this invention is not limited to the abnormality diagnostic means, in the above described embodiment, but can also comprise two of the battery abnormality detecting circuit 12 and the temperature abnormality detecting circuit 13, to impart an internally diagnostic function, detecting abnormality on other various circuits, to, for instance, CPU7, and in operation an abnormality flag is set correspondingly to each abnormality, then the abnormality flag can be utilized as a driving condition of the output inhibition flag FO.

Further this invention is not limited to the above described embodiment, in which an external output signal is turned off as an output inhibition configuration, but can be constituted in such a manner that an output state immediately before setting of the output inhibition flag is maintained or a previously set specific output pattern is output.

As detailed in the above description, the programmable controller relating to this if settable to a configuration of use necessary from the standpoint of its user, so that the output is inhibited for detection of whatever abnormal state at whatever control state, is convenient for the user, and is therefore capable of meeting every requirement from the user side.

With reference to FIG. 4~FIG. 8, description will now be made for the second embodiment of this invention.

Figure 4:
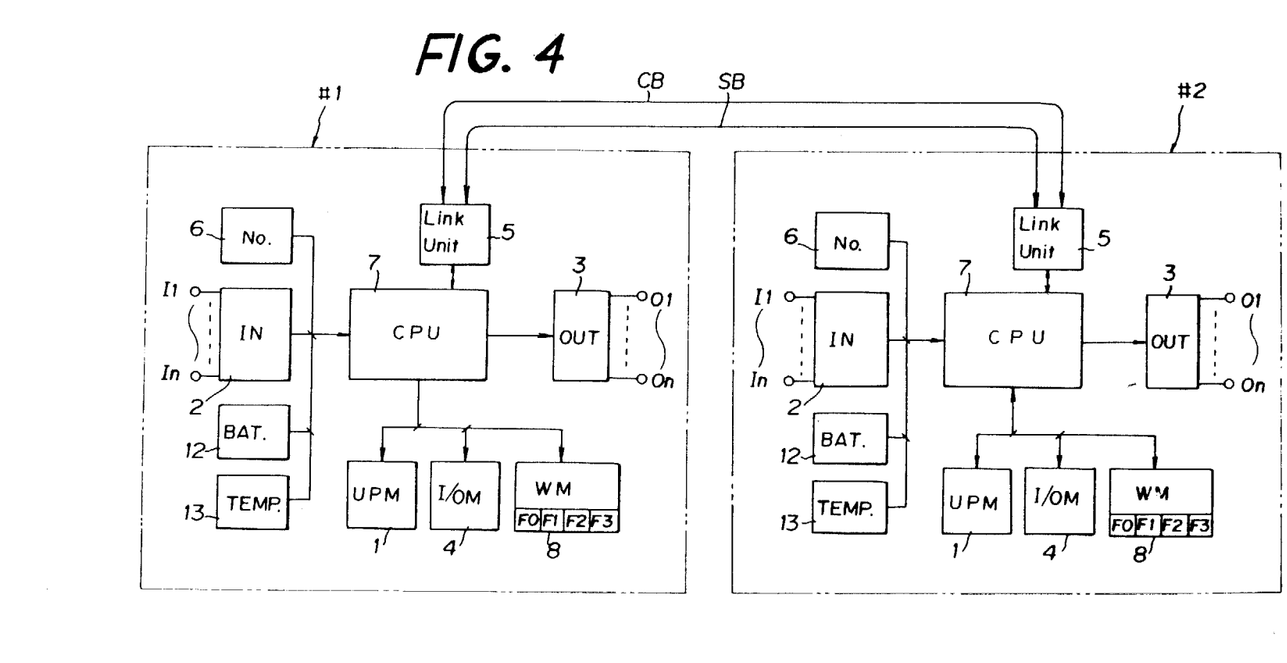
FIG. 4 is a block diagram for a control system of parallel link mode by using two sets of programmable controllers relating to the second embodiment of this invention.

FIG. 4, in which the numerals #1 and #2 are programmable controllers relating to this invention, shows the above described controller system of having a parallel link mode, by connecting two sets of programmable controllers of the same constitution with a link bus CB and abnormal signal line SB. The programmable controller #1, #2 is basically constituted with a user program memory 1, stored with a user program, input circuit 2, applied with an external input signal, output circuit 3, sending an external output signal, I/O memory 4, buffer memory of I/O data corresponding to the above described input circuit 2 and output circuit 3, instruction executing means, executing each instruction of the above described user program memory 1 successively at high speed and processing logical operation on the basis of the above described I/O memory 4 simultaneously rewriting output data of the above described I/O memory 4 from the processing result, input updating means, writing input data of the above described input circuit 2 in a prescribed area of the above described I/O memory 4, and output updating means, setting output data in a prescribed area of the above described I/O memory 4 to the above described output circuit 3. The programmable controllers, when used as a set, can be quite similarly operated as would be the conventional programmable controller.

The programmable controller relating to this invention, in order to construct the above described controller system of parallel link mode, is provided with a link unit 5, connecting the two sets of the programmable controllers #1, #2 with signal wires CB, SB, and machine number setter 6, for deciding the priority at the time of I/O data transfer between the two sets of the programmable controllers #1, #2. Further capacity of the I/O memory 4 contains an area corresponding to a number of terminals in the input circuit 2 and output circuit 3 of another machine in addition to an area for a number of terminals in the input circuit 2 and output circuit 3 of the intra machine. There are also provided I/O data exchange means and user program synchroexecuting means exchanging data of each I/O memory 4 with each other synchronously with executing action of each user program when the programmable controllers #1, #2 are connected by a link bus CB.

Principal signal processing action in the above described instruction executing means, input updating means, output updating means, I/O data exchange means, user program synchro-executing means, etc. of the programmable controller is performed by the central processing unit (CPU)7 constituted by a so-called microprocessor. This CPU7 uses the working memory 8 as a temporary storage area for various variable data to perform each processing action.

Figure 5:
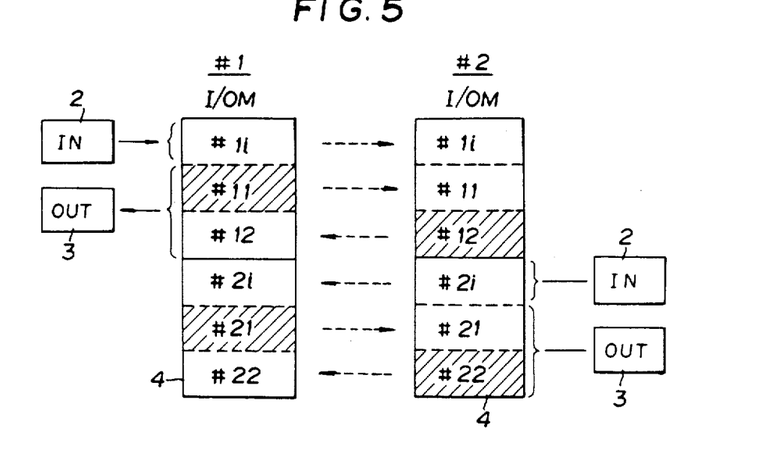
FIG. 5 is a view showing status of an assignment of an address area in each I/O memory in the same system as the above.

Address space of each I/O memory 4 in both machines #1, #2 is equal, and a division of address area in the I/O memory 4, as shown in FIG. 5, is such that area #1i corresponds to the input circuit 2 of the machine #1 while area #11 and #12 corresponds to the output circuit 3 of the machine #1. Area #11 is especially an area for output data to be rewritten by the user program of the machine #1, and area #12 is an area for output data to be rewritten by the user program of the machine #2. Similarly, #2i is an area corresponding to the input circuit 2 of the machine #2, while #21 and #22 are areas corresponding to the output circuit 3 of the machine #2. Area #21 is especially an area for output data to be rewritten by the machine #1 while #22 is an area for output data to be rewritten by the machine #2.

The above described I/O data exchange means is under such control that input data fetched to area #1i of the I/O memory 4 from the input circuit 2 in the machine #1 is transferred to #1i of the I/O memory 4 in the machine #2, further output data in area #11 of the I/O memory 4 rewritten in the machine #1 is transferred to area #11 of the machine #2, and output data of area #12 rewritten in the machine #2 is transferred to the machine #1, input data read from the input circuit 2 in the machine #2 to #2i is transferred to #2i in the machine #1, output data of #21 rewritten in the machine #1 is transferred to area #21 of the machine #2, and output data of #22 rewritten in the machine #2 is transferred to area #22 in the machine #1. A transfer turn of these I/O data and turns of I/O updating action in each machine and execution action of the user program will be described later.

Figure 6:
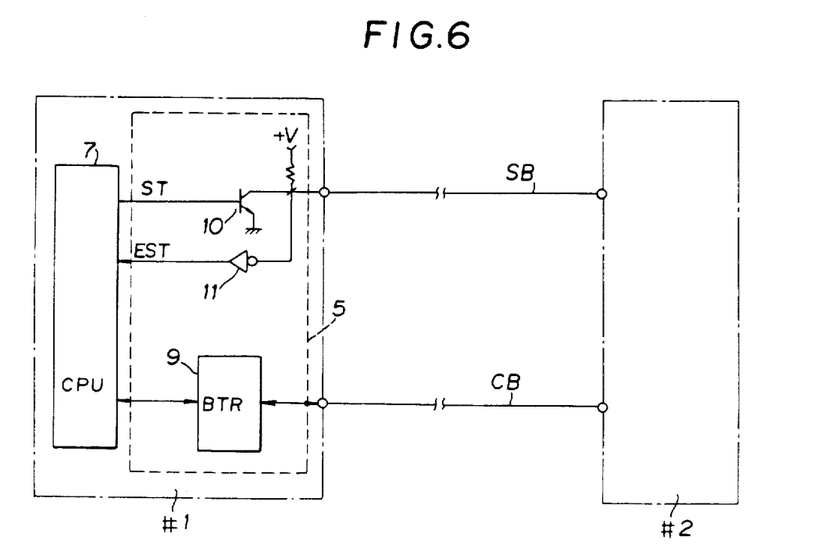
FIG. 6 is a diagram showing a circuit example of a link unit.

FIG. 6 shows in detail the above described link unit 5 relating to the link bus CB and abnormal signal line SB. As shown in FIG. 6, the CPU7 and the link bus CB are connected through a bus transceiver 9, and this performs the exchange of the above described I/O data. The abnormality signal line SB is constituted by an open collector bus, and transceiving of an abnormal signal between both machines #1, #2 is to be performed through this signal line. In short, an output element connected with the line SB in the link unit 5 consists of an open collector transistor 10. Then an abnormal signal ST output from the CPU7 becomes an H level, if the transistor 10 is driven, the abnormal signal line SB becomes active (L level). Further an inverter 11 is provided to fetch the state of the abnormal signal line SB to CPU7. When the abnormal signal line SB becomes active (L level), an output signal of the above described inverter 11 (called abnormal receiving signal E.ST) becomes the H level, thus an abnormal signal is received to CPU7. These construction is equivalent to an abnormal signal receiving and transmitting means.

Further, in the programmable controller described, a battery abnormality detecting circuit 12, detecting abnormal voltage of a battery, and temperature abnormality detecting circuit 13, detecting an abnormal rise of temperature in a device, are provided as abnormality detecting means detecting abnormality in the inside of the device. Outputs of these abnormality detecting circuits 12, 13 are fed to CPU7 and are always supervised by CPU7. Similarly the above described abnormal signal E.ST of another machine is always supervised by CPU7. And in the working memory 8, there are set an abnormality flag F1, set when abnormality is detected by the battery abnormality detecting circuit 12, abnormality flag F2, set when abnormality is detected by the temperature abnormality detecting circuit 13, and another machine abnormality flag F3, set when the abnormality receiving signal E.ST becomes the H level.

Further in the working memory 8, there is set an output inhibition flag FO set or reset from the result of optional logical operation between the above described abnormality flag F1, F2 and another machine abnormality flag F3 and further optional I/O data, by executing an instruction optionally set to the above described user program memory 1 as a part of the user program during the action of the above described instruction executing means. As described later, output inhibiting means is provided inhibiting action of the above described output updating means and obtaining a prescribed output state when said output inhibition flag FO is set.

Figure 7:
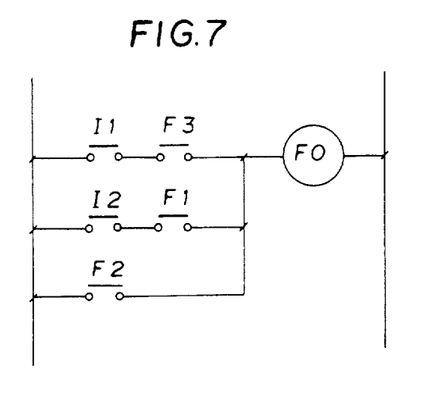
FIG. 7 is a view showing an example of a condition setting program for inhibition of output.

The output inhibition flag FO is optionally set to the user program so as to be set or reset on condition of the state of each flag F1, F2, F3 and optional I/O data, this means that as shown in FIG. 7 in case of, for instance, a programmable controller of rudder diagram mode, the output inhibition flag FO is used as an output relay, and each of the flags F1, F2, F3 is handled as an input contact on condition that said relay FO is driven, simultaneously an optional rudder diagram is constituted by using these input contacts F1, F2, F3 and optional I/O contacts relating to an objective control equipment, converted into a prescribed instruction format and previously set to the user program memory 1. A reference as shown in FIG. 7 shows a user program built in such a manner that the output inhibition flag FO is unconditionally set when the temperature abnormality flag F2 is set, in addition, the other machine abnormality flag F3 is set, the output inhibition flag FO is set when input contact I1 is turned on, the battery abnormality flag F1 is set and the output inhibition flag FO is set when input contact I2 is turned on.

Figure 8A:
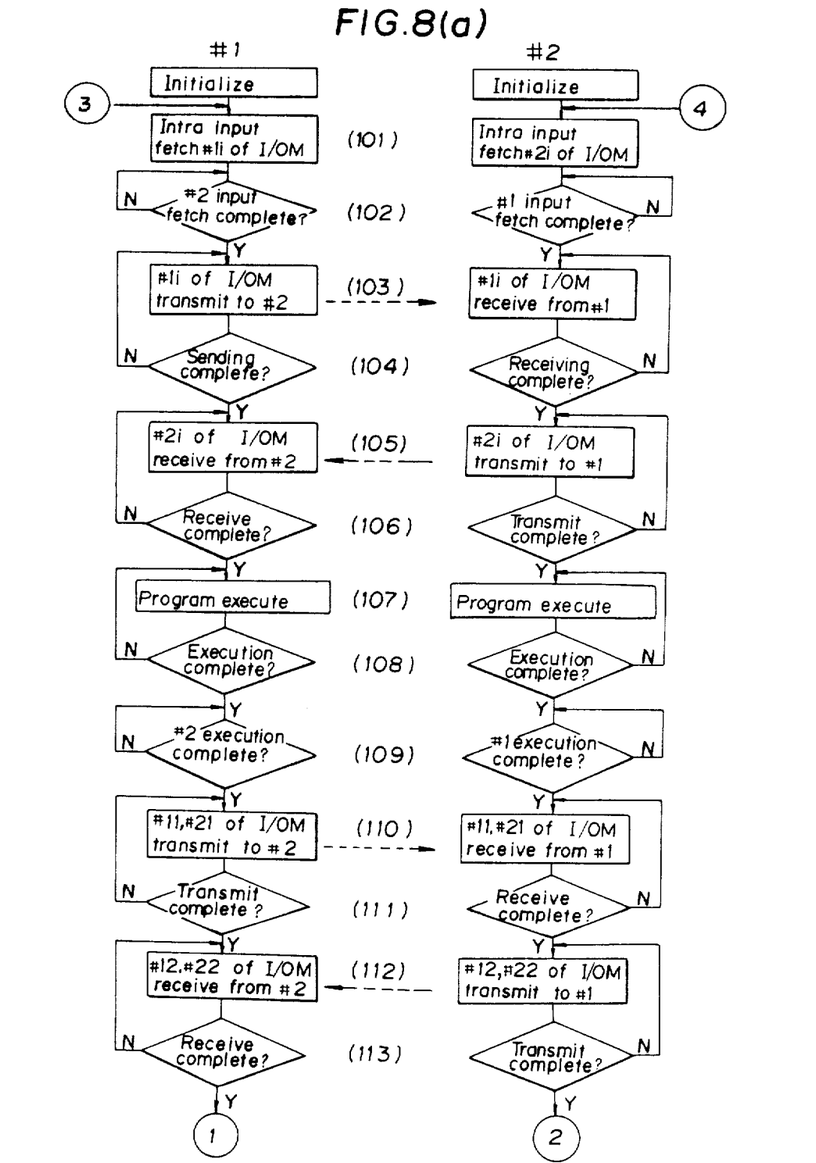
FIGS. 8a and 8b are a flow chart showing processing procedures of each machine constituting the same system as in the above.
Figure 8B:
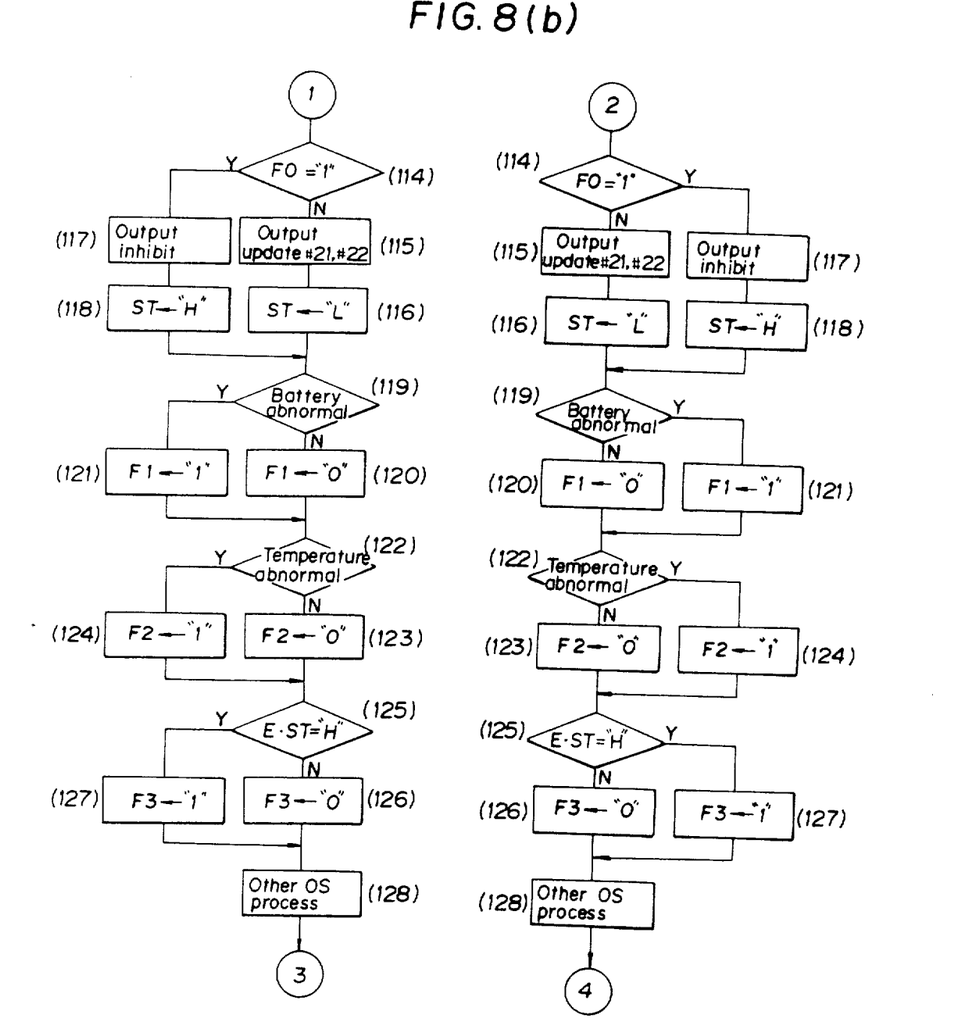

Then in accordance with a flow chart in FIG. 8, working procedures by the CPU7 in both machines will be described for the controller system having a parallel link mode, comprised by two sets of the above described programmable controllers #1, #2. When an initializing process is completed in both machines #1, #2, the first step 101 fetches input data applied to the input circuit 2 of the respective intra machine to a prescribed area (area #1i for machine #1 and area #2i for machine #2) of the I/O memory 4. When this input updating action is ended, the end of the action is transmitted to each other machine. The next step 102 waits completion of the input updating action transmitted from each other machine. The machines #1, #2, if both complete the input updating action, proceed to the next steps 103, 104, and input data in area #1i of the I/O memory in the machine #1 is transferred to the machine #2. The next step 105, 106 transfer input data in area #2i of the I/O memory 4 in the machine #2 to the machine #1. In this way, input data are exchanged between both machines #1, #2.

Successively each machine #1, #2 proceeds to the steps 107, 108 to execute round the user program stored in the respective user program memory 1. In this way, output data of the I/O memory 4 is rewritten in accordance with the execution result of each instruction, simultaneously a state of the above described output inhibition flag FO is also decided. Both machines #1, #2 transmit execution of the user program, if completed, to each other. The step 109 waits for each machine to check if execution of the user program is completed or not.

The machines #1, #2, if both complete execution of the user program, proceed to the next steps 110, 111 to transfer output data in areas #11 and #21 of the I/O memory 4 in the machine #1 to the machine #2. Successively proceeding to steps 112, 113, output data in areas #12 and #22 of the I/O memory 4 in the machine #2 are transferred to the machine #1. In this way, rewritten output data are exchanged with each machine by executing the respective user program of each machine #1, #2.

In the next step 114, decision is made for whether the output inhibition flag FO is set or reset. The output inhibition flag FO, when reset, means that normal action not inhibiting control output is performed, in this case, proceeding to step 115, output updating action is performed. That is, in the machine #1, output data in areas #11, #12 of the I/O memory 4 are transferred to the output circuit 3. While in the machine #2, output data in areas #21 and #22 are transferred to the output circuit 3. In the next step 116, an abnormal signal ST is turned to the L level and a transistor 10 in the link unit 5 is turned to non-conduction.

In the next step 119, output of the battery abnormality detecting circuit 12 is checked to decide whether abnormality is existent or not. In the case of an abnormality existing, the abnormality flag F1 is set in step 121, while in the case of an abnormality not existing, the abnormality flag F1 is reset in step 120. In the following step 122, output of the temperature abnormality detecting circuit 13 is checked to decide whether it is abnormal or not. The abnormality flag F2 is set in step 124 when abnormal, while the abnormality flag F2 is reset in step 123 when not abnormal. In the following step 125, an abnormal receiving signal E.ST from the link unit 5 is checked to decide whether this signal E.ST is at the H level (abnormal) or not. When abnormal, the other machine abnormality flag F3 is set in step 127, when not abnormal, the other machine abnormality flag F3 is reset in step 126. In the following step 128, a various OS process (operating system), such as input accepting process from a program console not monitor displayed or not illustrated, is performed and then the step returns to input updating action in step 101.

The above mentioned steps from 101 to 128 shall be repeatedly executed at high speed. In their execution process, I/O data changes in accordance with the progress of a control state in an objective control equipment, further the abnormality of flags F1, F2 and other machine abnormality flag F3 are changed in accordance with outputs of the respective abnormality detecting circuit 12, 13 and the state of the abnormal signal line SB in both machines #1, #2. Then in the machine #1, where the driving condition of the output inhibition flag FO is set by the user side as shown in, for instance, FIG. 7, when turned on, for instance, the input contact I1 sets the battery abnormality flag F1, the output inhibition flag FO is set by execution of the user program in steps 107, 108. In this case, step 114, in which the output inhibition flag FO is set, is detected and control proceeds to step 117 without performing output updating action in step 115, and in this step 117 an external output signal led out from the output circuit 3 is all turned off (output inhibition). Then proceeding to step 118, the abnormal ST is turned to the H level to drive the transistor 10 and turn the abnormal signal line SD to the active state (L level), and the step proceeds to step 119.

On the other hand, the abnormal signal line SB is in an active state by the machine #1, then the abnormal receiving signal E.ST in the machine #2 side, turned to the H level when the step 125 is executed, is detected, thus the other machine abnormality flag F3 is set. Then on the basis of the setting of this other machine abnormality flag F3, if the user program is executed, the output inhibition flag FO in the machine #2 is also set in accordance with a content of the program. In short, an output inhibition state, obtained also in the machine #2 by receiving an abnormal signal of the machine #1, can be optionally set by the user program of the machine #2.

Further this invention is not limited to the above described embodiments, in which a system of parallel link mode is constituted by two sets of programmable controllers, but can be applied quite similarly also to the system of parallel link mode as constructed by still more programmable controllers. Further a diagnostic function of abnormality in each programmable controller contains not only the before listed embodiment but a parity check function for a data bus in CPU or a function detecting various abnormality on the other circuit.

Further this invention is not limited to the above described embodiment, in which, an external output signal is all turned off as a configuration of output inhibition, but can be constituted in such a manner that an output state immediately before the setting of the output inhibition flag is maintained or a previously set specific output pattern is output.

As detailed in the above, the programmable controller relating to this invention, when constituting a controller system of parallel link mode by plural sets, permits the setting of a condition meeting a configuration of use as the whole system from the standpoint of the user side in such that control output action of each machine is inhibited for whatever abnormal state in each machine and whatever control state is desireable, which is different from each controller independently inhibiting its output action unconditionally for and abnormality as in the prior art.

As many apparently widely different embodiments of this invention may be made without departing from the spirit and scope thereof, it is to be understood that the invention is not limited to the specific embodiments herein described except as defined in the appended claims.

What is claimed is:

1. A programmable controller system including at least two programmable controllers which are connected in a parallel link mode to perform operations on input and output data which have logical states, comprising:
   basic control means provided in each of said at least two programmable controllers for performing a logical operation between said input and output data in accordance with each instruction of a user program optionally set by a user in said basic control means, and for simultaneously updating output data in accordance with the result of said logical operation;
   a plurality of abnormality diagnostic means provided in each of said at least two programmable controllers for detecting an abnormality which causes said system to operate improperly in said programmable controller system, and producing a logical output state indicative thereof; and
   abnormality processing control means provided in each of said at least two programmable controllers, for specifying a condition in which an output is inhibited by optionally, based on system conditions, combining a logical output state from each one of said plurality of abnormality diagnostic means from at least one of said programmable controllers and said logical state of at least one of said input and output data and using such optional combination as a part of said user program which is externally supplied, wherein said abnormality processing control means is coupled to said basic control means and is also for inhibiting an updating action of said output data to obtain a prescribed output state when said condition in which output is inhibited is established as a result of execution of said user program.

2. The programmable controller system in claim 1, said basic control means comprising:
   user program memory means for storing said user program,
   an input circuit for receiving an external input signal,
   an output circuit for outputting an output signal,
   an I/O memory working as a buffer memory of I/O data inputted and outputted by said input circuit and output circuit,
   instruction executing means for successively executing each instruction of said user program memory and processing arithmetic operations on the basis of data in said I/O memory then rewriting output data of said I/O memory as the result of said arithmetic processing,
   input updating means for writing input data from said input circuit in a prescribed area of said I/O memory, and
   output updating means for setting output data in a prescribed area of said I/O memory to said output circuit,
   and said abnormality processing control means comprising:
   plurality of abnormality flags correspondingly provided in accordance with each of said plurality of abnormality diagnostic means, said plurality of abnormality flags being set or reset by the detection results of said plurality of abnormality diagnostic means,
   an output inhibition flag, being set or reset as the result of optional logical operation between said abnormality flags and optional I/O data by executing an instruction optionally set to said user program memory as a part of the user program, and output inhibiting means for inhibiting action of said output updating means to obtain a prescribed output state when said output inhibition flag is set.

3. The programmable controller system in claim 1, said basic control means comprising:

a second I/O memory provided in each of said at least two programmable controllers, I/O data exchanging and user program synchronously executing means provided in each of said at least two programmable controllers for exchanging data from the I/O memory with another programmable controller synchronously with executing the user program when connected to said another programmable controller, and said abnormality processing control means comprising:

a plurality of abnormality flags correspondingly provided with each one of said plurality of abnormality diagnostic means, said plurality of abnormality flags being set or reset by the detection results of said plurality of abnormality diagnostic means, abnormality signal receiving means for receiving an abnormal signal transmitted from said another programmable controller, an abnormality flag being set in said another programmable controller when an abnormal signal is received by said receiving means, an output inhibition flag which is set and reset as a result of an optional logical operation between said abnormality flags and said another programmable controller abnormality flag and optional I/O data by executing an instruction optionally set as part of the user program, output inhibiting means for inhibiting control output action to obtain a prescribed output state when said output inhibition flag is set, and abnormal signal transmitting means for sending an abnormal signal to said another programmable controller when said output inhibition flag is set.

4. A programmable controller, comprising:

means for diagnosing plural types of abnormalities which can cause said programmable controller operate improperly occurring within said programmable controller and producing information indicative thereof;

memory means for storing said information indicative of said abnormalities diagnosed by said diagnosing means;

processing means for performing logical operations based on a user program, and for accepting externally interfaced input data and producing output data;

means for configuring a program based on conditions of said stored information and said externally interfaced input data from said processing means; and means for inhibiting said producing of said output data by said processing means based on said program configured by said configuring means.

5. A controller as in claim 4 wherein said configuring means operates to configure a program when a plurality of said abnormalities are detected and at least one of said input data are simultaneously in respective predetermined states.

6. An apparatus as in claim 5 wherein each abnormality is represented by an abnormality flag which is selectively set and reset by said abnormality diagnosing means.

* * * * *